(12) United States Patent
Tahara

(10) Patent No.: US 12,657,918 B2
(45) Date of Patent: Jun. 16, 2026

(54) REMOTE MONITORING APPARATUS, REMOTE MONITORING METHOD, COMPUTER PROGRAM AND RECORDING MEDIUM

(71) Applicant: NEC Corporation, Tokyo (JP)

(72) Inventor: Yuji Tahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 871 days.

(21) Appl. No.: 17/617,040

(22) PCT Filed: Mar. 27, 2020

(86) PCT No.: PCT/JP2020/014123
§ 371 (c)(1),
(2) Date: Dec. 7, 2021

(87) PCT Pub. No.: WO2020/250544
PCT Pub. Date: Dec. 17, 2020

(65) Prior Publication Data
US 2022/0230441 A1 Jul. 21, 2022

(30) Foreign Application Priority Data

Jun. 10, 2019 (JP) ................................. 2019-107762

(51) Int. Cl.
*G06V 20/52* (2022.01)
*G06F 16/58* (2019.01)
(Continued)

(52) U.S. Cl.
CPC .......... *G06V 20/52* (2022.01); *G06F 16/5866* (2019.01); *G06V 40/10* (2022.01); *H04N 7/18* (2013.01)

(58) Field of Classification Search
CPC .... G06F 16/5866; G06Q 30/06; G06V 10/25; G06V 20/52; G06V 40/10; G06V 40/103; G08B 25/00; H04N 7/18; H04N 7/188
See application file for complete search history.

(56) References Cited

U.S. PATENT DOCUMENTS 9,703,518 B2 * 7/2017 Yamakita .............. G06F 3/0481
9,886,678 B2 2/2018 Yan
(Continued)

FOREIGN PATENT DOCUMENTS

JP 2006-139106 A 6/2006
JP 2010-119139 A 5/2010
(Continued)

OTHER PUBLICATIONS

International Search Report for PCT Application No. PCT/JP2020/ 014123, mailed on Jun. 16, 2020.
(Continued)

*Primary Examiner* — Kenny A Cese
(74) *Attorney, Agent, or Firm* — Sughrue Mion, PLLC

(57) ABSTRACT

A remote monitoring apparatus includes a distribution unit that (i) distributes to a user terminal a second image to which position information indicating a different position from that indicated by first position information, which is position information added to a first image, is added and to which time information indicating a same time as that indicated by first time information, which is time information added to the first image, is added when receiving from the user terminal a first switching instruction indicating image switching of the first image in one direction, and (ii) distributes to the user terminal a third image to which position information indicating a same position as that indicated by the first position information is added and to which time information indicating a different time from that indicated by the first time information is added, when (Continued)

receiving from the user terminal a second switching instruction indicating image switching of the first image in another direction that crosses the one direction.

10 Claims, 6 Drawing Sheets

(51) Int. Cl.
    *G06V 40/10*        (2022.01)
    *H04N 7/18*        (2006.01)

(56) References Cited

U.S. PATENT DOCUMENTS

| | | | |
|---|---|---|---|
| 10,043,360 | B1 | 8/2018 | Mullins |
| 10,540,390 | B1 | 1/2020 | Angel |
| 11,057,590 | B2 * | 7/2021 | Seiger .................... H04N 23/56 |
| 2010/0073565 | A1 | 3/2010 | Hwang |
| 2011/0143779 | A1 | 6/2011 | Rowe |
| 2014/0250126 | A1 * | 9/2014 | Baldwin ................. G06F 16/51 |
| | | | 707/737 |
| 2015/0009372 | A1 | 1/2015 | Min |
| 2015/0189161 | A1 | 7/2015 | Chun |
| 2015/0253962 | A1 * | 9/2015 | Cho .................... G06F 3/04842 |
| | | | 715/765 |
| 2017/0053191 | A1 | 2/2017 | Koyama |
| 2018/0091728 | A1 * | 3/2018 | Brown .................... H04N 23/62 |
| 2018/0211205 | A1 | 7/2018 | Takemoto |
| 2018/0300802 | A1 | 10/2018 | Nishino et al. |
| 2018/0343442 | A1 | 11/2018 | Yoshikawa |
| 2019/0005719 | A1 | 1/2019 | Fleischman |
| 2019/0019285 | A1 | 1/2019 | Matsumoto et al. |
| 2019/0141410 | A1 | 5/2019 | Zverina |
| 2019/0236531 | A1 * | 8/2019 | Adato .................... H04N 23/80 |
| 2020/0005231 | A1 | 1/2020 | Nakagawa et al. |
| 2020/0074402 | A1 | 3/2020 | Adato |
| 2020/0154095 | A1 | 5/2020 | Fleischman |
| 2020/0210683 | A1 | 7/2020 | Liu |

FOREIGN PATENT DOCUMENTS

| | | | |
|---|---|---|---|
| JP | 2010-252386 | A | 11/2010 |
| JP | 2016-057952 | A | 4/2016 |
| JP | 2017-084293 | A | 5/2017 |
| JP | 2017-162375 | A | 9/2017 |
| JP | 2017-182653 | A | 10/2017 |
| JP | 2018-092455 | A | 6/2018 |
| WO | 2018/163547 | A1 | 9/2018 |

OTHER PUBLICATIONS

US Office Action for U.S. Appl. No. 18/237,714 mailed on Mar. 19, 2024.

US Office Action for U.S. Appl. No. 18/237,766 mailed on Mar. 20, 2024.

US Office Action for U.S. Appl. No. 18/237,778 mailed on Mar. 21, 2024.

U.S. Office Action for U.S. Appl. No. 18/237,766, mailed on Sep. 12, 2024.

U.S. Office Action for U.S. Appl. No. 18/237,778, mailed on Sep. 11, 2024.

* cited by examiner

1

11:00              11:00              11:00

13:00              12:00              11:00

REMOTE MONITORING APPARATUS, REMOTE MONITORING METHOD, COMPUTER PROGRAM AND RECORDING MEDIUM

This application is a National Stage Entry of PCT/JP2020/014123 filed on Mar. 27, 2020, which claims priority from Japanese Patent Application 2019-107762 filed on Jun. 10, 2019, the contents of all of which are incorporated herein by reference, in their entirety.

TECHNICAL FIELD

The present invention relates to a remote monitoring apparatus, a remote monitoring method, a computer program and a recording medium.

BACKGROUND ART

For an apparatus of this type, for example, an apparatus that monitors a display area at a store has been proposed (see Patent Literature 1). Other related techniques include Patent Literatures 2 and 3.

CITATION LIST

Patent Literature

Patent Literature 1: JP2016-057952A
Patent Literature 2: JP2018-092455A
Patent Literature 3: International Publication No. WO2018/163547A1

SUMMARY OF INVENTION

Technical Problem

In a manpower-saving or an unmanned store, an observer often remotely monitors a state of an inside of the store. For example, if an image of the inside of the store captured by a monitor camera is presented to the observer without any contrivance, it is hard for the observer to appropriately grasp the state of the inside of the store, which is technically problematic.

In view of the problems described above, it is therefore an example object of the present invention to provide a remote monitoring apparatus, a remote monitoring method, a computer program, and a recording medium that are configured to appropriately grasp the state of the inside of a monitoring target by an observer.

Solution to Problem

A remote monitoring apparatus according to an example aspect of the present invention is a remote monitoring apparatus including: a storage unit that stores a plurality of images to each of which a position information and a time information are added; and a distribution unit that distributes a first image of the plurality of images to a user terminal, wherein the distribution unit (i) distributes to the user terminal a second image to which a position information indicating a different position from that indicated by a first position information, which is the position information added to the first image, is added and to which a time information indicating a same time as that indicated by a first time information, which is the time information added to the first image, is added when receiving from the user terminal a first switching instruction indicating image switching of the first image in one direction, and (ii) distributes to the user terminal a third image to which a position information indicating a same position as that indicated by the first position information is added and to which a time information indicating a different time from that indicated by the first time information is added when receiving from the user terminal a second switching instruction indicating image switching of the first image in another direction that crosses the one direction.

A remote monitoring method according to an example aspect of the present invention is a remote monitoring method in a remote monitoring apparatus including: a storage unit that stores a plurality of images to each of which a position information and a time information are added; and a distribution unit that distributes a first image of the plurality of images to a user terminal, the remote monitoring method including: a first distribution step that distributes to the user terminal a second image to which a position information indicating a different position from that indicated by a first position information, which is the position information added to the first image, is added and to which a time information indicating a same time as that indicated by a first time information, which is the time information added to the first image, is added, when a first switching instruction indicating image switching of the first image in one direction is received from the user terminal, and second distribution step that distributes to the user terminal a third image to which a position information indicating a same position as that indicated by the first position information is added and to which a time information indicating a different time from that indicated by the first time information is added, when a second switching instruction indicating image switching of the first image in another direction that crosses the one direction is received from the user terminal.

A computer program according to an example aspect of the present invention allows a computer to perform the remote monitoring method according to the example aspect described above.

A recording medium according to an example aspect of the present invention is a recording medium on which the computer program according to the example aspect described above is recorded.

Advantageous Effects of Invention

According to the remote monitoring apparatus, the remote monitoring method, the computer program, and the recording medium in the respective example aspects described above, the observer can appropriately grasp the state of the monitoring target.

DESCRIPTION OF EXAMPLE EMBODIMENTS

A remote monitoring apparatus, a remote monitoring method, a computer program, and a recording medium according to example embodiments will be described with reference to the drawings. The following describes the remote monitoring apparatus, the remote monitoring method, the computer program, and the recording medium according to the example embodiment, by using a remote monitoring system 1 that remotely monitors a store.
(Remote Monitoring System)

Figure 1:
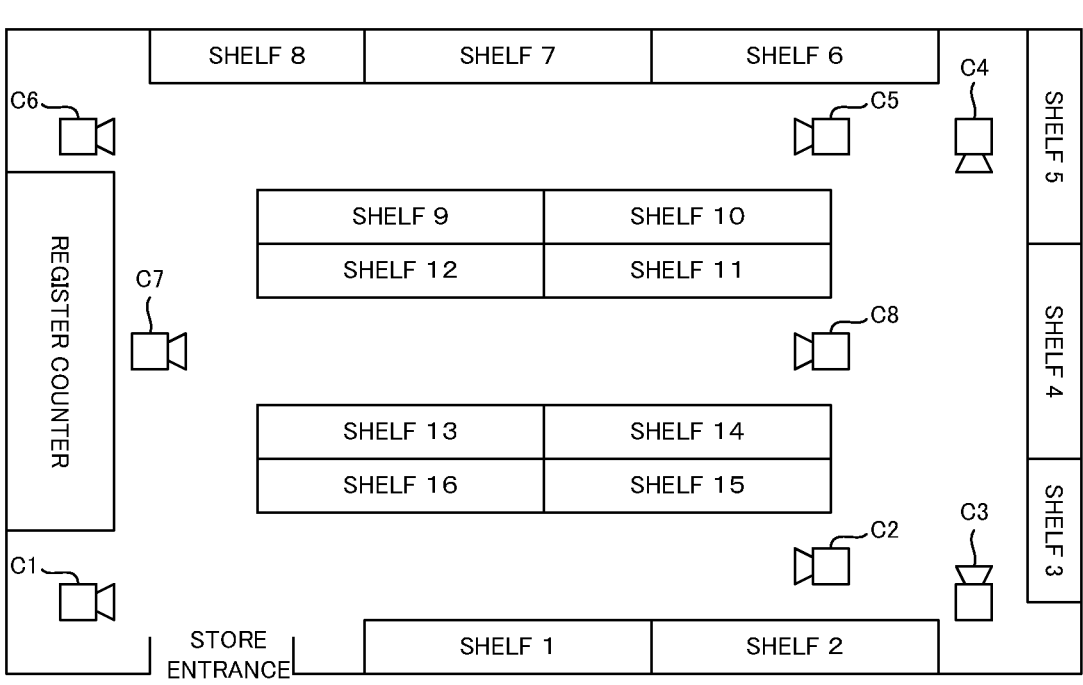
FIG. 1 is a diagram illustrating an overview of a remote monitoring system according to an example embodiment.
Figure 1:
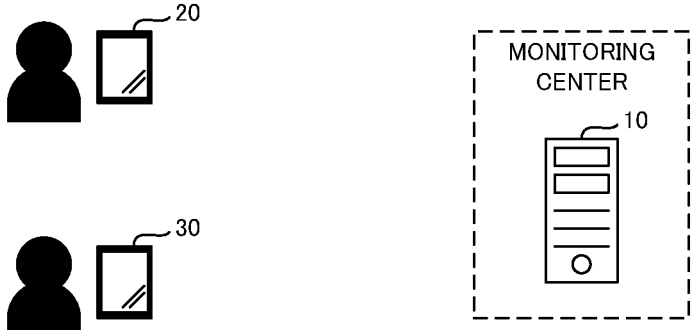

A remote monitoring system 1 according to an example embodiment will be described with reference to FIG. 1. FIG. 1 is a diagram illustrating an overview of a remote monitoring system according to the example embodiment.

In FIG. 1, the remote monitoring system 1 includes a remote monitoring apparatus 10 installed in a monitoring center, user terminals 20 and 30, a plurality of monitor cameras C1 to C8 installed in a store to be monitored. The arrangement and the number of the monitor cameras C1 to C8 in FIG. 1 are exemplary, and are not limited to this example. In addition, the store to be monitored is equipped with shelves 1 to 16 as product display shelves, but it is not limited to this example. There may be two or more stores to be monitored.

The remote monitoring apparatus 10, the user terminals 20 and 30, and the monitor cameras C1 to C8 are connected via a not-illustrated network, such as, for example, the Internet. Video signals outputted from the respective monitor cameras C1 to C8 are sequentially transmitted to the remote monitoring apparatus 10 via the network. The remote monitoring apparatus 10 obtains, via the network, sensor signals outputted from various not-illustrated sensors installed in the store to be monitored (e.g., a temperature sensor of a refrigerating or freezing facility/equipment, a remaining amount detection sensor of a beverage dispenser, a vibration sensor for anti-theft of a cash register, etc.).
(Remote Monitoring Apparatus)

Figure 2:
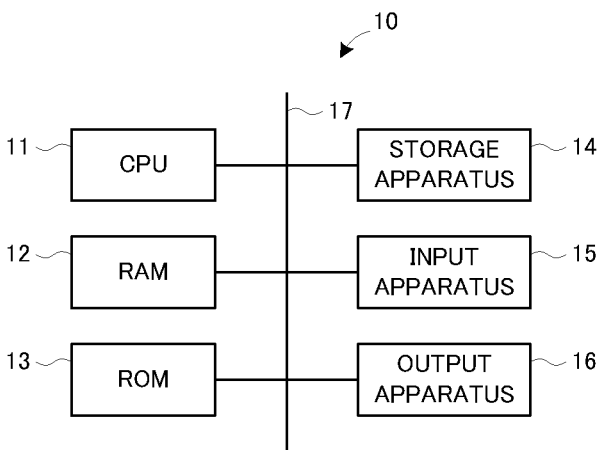
FIG. 2 is a block diagram illustrating a hardware configuration of a remote monitoring apparatus according to the example embodiment.

Next, a hardware configuration of the remote monitoring apparatus 10 will be described with reference to FIG. 2. FIG. 2 is a block diagram illustrating the hardware configuration of the remote monitoring apparatus 10 according to the example embodiment.

In FIG. 2, the remote monitoring apparatus 10 includes a CPU (Central Processing Unit) 11, a RAM (Random Access Memory) 12, a ROM (Read Only Memory) 13, a storage apparatus 14, an input apparatus 15 and an output apparatus 16. The CPU 11, the RAM 12, the ROM 13, the storage apparatus 14, the input apparatus 15, and the output apparatus 16 are interconnected through a data bus 17.

The CPU 11 reads a computer program. For example, the CPU 11 may read a computer program stored by at least one of the RAM 12, the ROM 13 and the storage apparatus 14. For example, the CPU 11 may read a computer program stored in a computer-readable recording medium, by using a not-illustrated recording medium reading apparatus. The CPU 11 may obtain (i.e., read) a computer program from a not-illustrated apparatus disposed outside the remote monitoring apparatus 10, through a network interface. The CPU 11 controls the RAM 12, the storage apparatus 14, the input apparatus 15, and the output apparatus 16 by executing the read computer program. Especially in the example embodiment, when the CPU 11 executes the read computer program, a logical functional block(s) for remotely monitoring the store to be monitored is implemented in the CPU 11. In other words, the CPU 11 is configured to function as a controller for remotely monitoring the management target. A configuration of the functional block implemented in the CPU 11 will be described in detail later with reference to FIG. 3.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer program to be executed by the CPU 11. The ROM 13 may otherwise store fixed data. The ROM 13 may be, for example, a P-ROM (Programmable ROM).

The storage apparatus 14 stores the data that is stored for a long term by the remote monitoring apparatus 10. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the remote monitoring apparatus 10. The input apparatus 15 may include, for example, at least one of a keyboard, a mouse, and a touch panel.

The output apparatus 16 is an apparatus that outputs information about the remote monitoring apparatus 10 to the outside. For example, the output apparatus 16 may be a display apparatus that is configured to display information about the remote monitoring apparatus 10.

Figure 3:
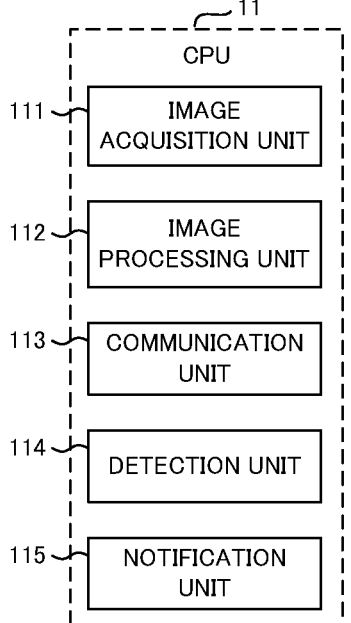
FIG. 3 is a block diagram illustrating a functional block implemented in a CPU of the remote monitoring apparatus according to the example embodiment.

Next, a configuration of the functional block implemented in the CPU 11 will be described with reference to FIG. 3. FIG. 3 is a block diagram illustrating the functional block implemented in the CPU 11 of the remote monitoring apparatus 10.

As illustrated in FIG. 3, an image acquisition unit 111, an image processing unit 112, a communication unit 113, a detection unit 114, and a notification unit 115 are implemented in the CPU 11 as the logical functional block.

Figure 4:
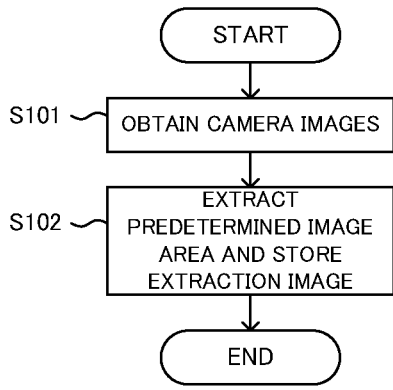
FIG. 4 is a flowchart illustrating operation at the time of image acquisition of the remote monitoring apparatus according to the example embodiment.

Firstly, the image acquisition unit 111 and the image processing unit 112 will be described with reference to a flowchart in FIG. 4. In FIG. 4, the image acquisition unit 111 receives the video signals outputted from the respective monitor cameras C1 to C8 and obtains a plurality of temporally continuous frame images (i.e., camera images) for each monitor camera (step S101).

The image processing unit 112 performs predetermined image processing, such as, for example, distortion correction and person removal, on the frame images. Then, the image processing unit 112 extracts a predetermined image area from the frame image and generates an extraction image.

The image processing unit 112 stores the extraction image in the storage apparatus 14 (step S102). Here, the extraction image is provided with a time information (which is typically a time information based on a time indicated by a time stamp of a frame image) and with a position information corresponding to the extraction image area.

The image processing unit 112 may store the extraction image that is extracted from a part (e.g., a frame image of 00 minutes per hour, etc.) of the frame images obtained in the step S101 in the storage apparatus 14. In this case, the image processing unit 112 may not target all the frame images obtained in the step S101 for the predetermined image processing. Furthermore, since the existing techniques can be applied to the distortion correction and the person removal, a detailed description thereof will be omitted.

Figures 6A, 6B, 6C:
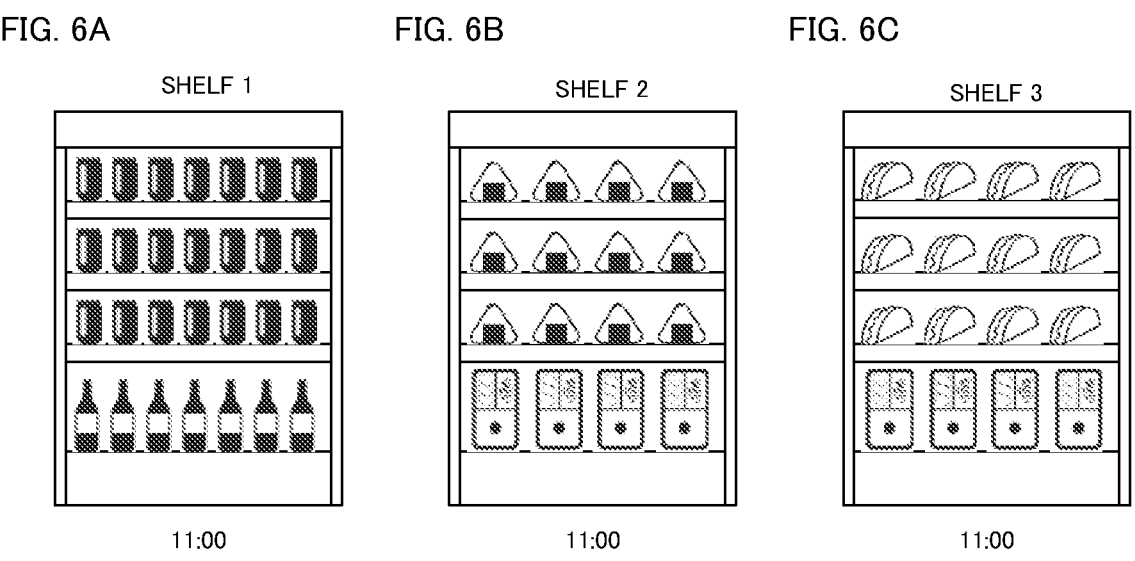
FIG. 6A to FIG. 6C illustrate an example of an image distributed to a user terminal.

In this example embodiment, the predetermined image area to be extracted from the frame image is set to generate an image for each product display shelf, for example, as illustrated in FIG. 6A to FIG. 6C, as the extraction image. Such a predetermined image area may be set manually or automatically, for example, at the time of introduction of the remote monitoring system 1.

Figure 5:
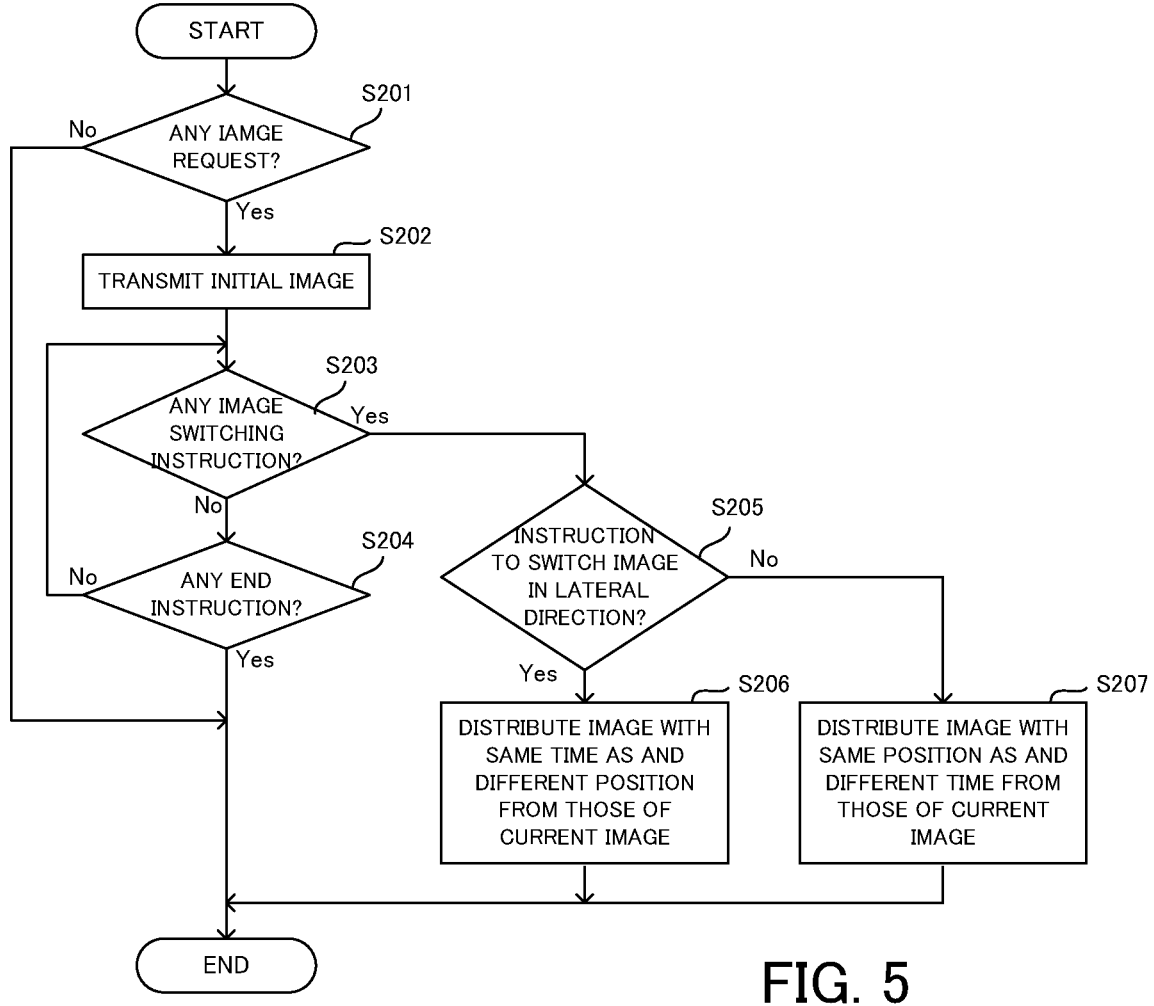
FIG. 5 is a flowchart illustrating operation at the time of image distribution of the remote monitoring apparatus according to the example embodiment.

Next, the communication unit 113 will be described with reference to a flowchart in FIG. 5. In FIG. 5, the communication unit 113 determines whether or not there is an image request from the user terminal (which is herein assumed to be the user terminal 20 for convenience) (step S201). In the step S201, when it is determined that there is no image request (the step S201: No), the operation is ended. Then, the step S201 may be performed again after a lapse of a predetermined time (e.g., several tens of milliseconds to several hundred milliseconds, etc.).

In the step S201, when it is determined that there is an image request (the step S201: Yes), the communication unit 113 distributes an initial image to the user terminal 20 (step S202). Here, the initial image may be an extraction image that is provided, for example, with the time information indicating a time that is the nearest to a current time and with the position information corresponding to the shelf 1 (see FIG. 1), among the extraction images stored in the storage apparatus 14.

Then, the communication unit 113 determines whether or not there is an image switching instruction from the user terminal 20 (step S203). In the step S203, when it is determined that there is no image switching instruction (the step S203: No), the communication unit 113 determines whether or not there is an end instruction from the user terminal 20 (step S204).

In the step S204, when it is determined that there is an end instruction (the step S204: Yes), the operation is ended. On the other hand, in the step S204, when it is determined that there is no end instruction (the step S204: No), the step S203 is performed (i.e., it will be in a standby state until the image switching instruction or the end instruction is given).

In the step S203, when it is determined that there is an image switching instruction (the step S203: Yes), the communication unit 113 determines whether or not it is an instruction to switch the image in one direction (for which, the example embodiment describes an example of adopting a lateral direction) in the user terminal 20 (step S205).

In the step S205, when it is determined that it is the instruction to switch the image in the lateral direction (the step S205: Yes), the communication unit 113 distributes to the user terminal 20 an extraction image that is provided with the time information indicating the same time as that indicated by the time information added to an image currently distributed to the user terminal 20 and with the position information indicating a different position from that indicated by the position information added to the currently distributed image (step S206).

If an image illustrated in FIG. 6A is currently distributed to the user terminal 20, for example, an image illustrated in FIG. 6B or FIG. 6C is distributed to the user terminal 20 by the step S206. Incidentally, the time illustrated in a lower part of each of the images in FIG. 6A to FIG. 6C is the time indicated by the time information added to each image.

In the step S205, when it is determined that it is not the instruction to switch the image in the lateral direction (the step S205: No), it means that as the image switching instruction, there is an instruction to switch the image in another direction in the user terminal 20 (i.e., a direction of crossing the one direction, and in the example embodiment, an example that adopts a vertical direction will be described as an example of another direction). In this case, the communication unit 113 distributes to the user terminal 20 an extraction image that is provided with the time information indicating a different time from that indicated by the time information added to an image currently distributed to the user terminal 20 and the position information indicating the same position as that indicated by the position information added to the currently distributed image (step S207).

Figures 7A, 7B, 7C:
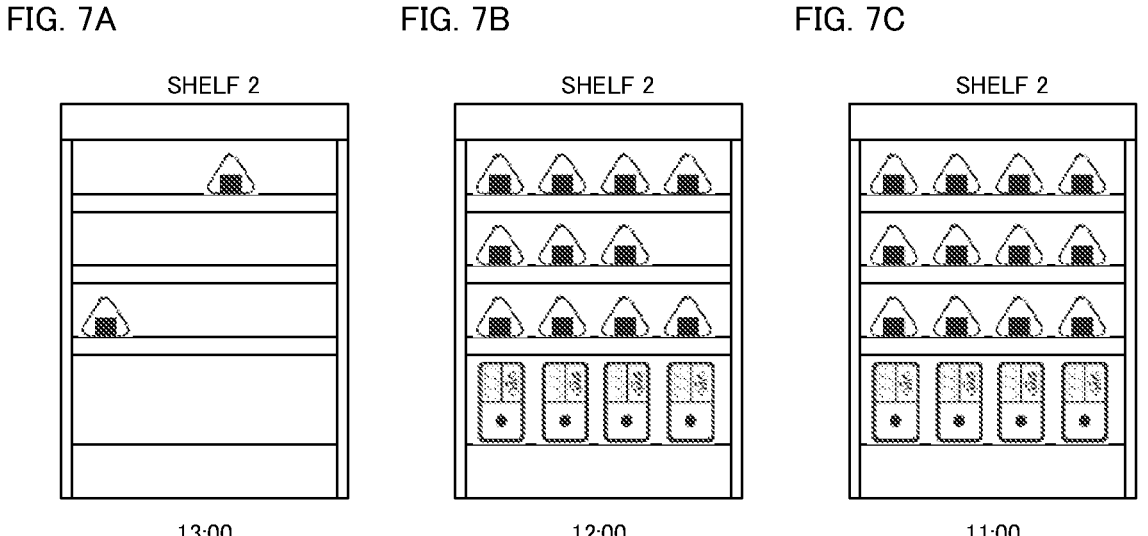
FIG. 7A to FIG. 7C illustrate another example of the image distributed to the user terminal.

If an image illustrated in FIG. 7A is currently distributed to the user terminal 20, for example, an image illustrated in FIG. 7B or FIG. 7C is distributed to the user terminal 20 by the step S207. Incidentally, the time illustrated in a lower part of each of the images in FIG. 7A to FIG. 7C is the time indicated by the time information added to each image.

When the user terminal 20 is, for example, a tablet terminal, the "instruction to switch the image in the lateral direction" and the "instruction to switch the image in the vertical direction" described above may be a "swipe in the lateral direction" and a "swipe in the vertical direction", or a "tap at the right end or left end of the tablet terminal" and a "tap at the upper end or lower end of the tablet terminal", respectively. When the user terminal 20 is, for example, a personal computer, he "instruction to switch the image in the lateral direction" and the "instruction to switch the image in the vertical direction" described above may be a "click at the right end or left end of a displayed image" and a "click at the upper end or lower end of the displayed image", respectively.

In the step S206, it is desirable that the communication unit 113 distributes to the user terminal 20 an extraction image that is provided with the time information indicating the same time as that indicated by the time information added to the image currently distributed to the user terminal 20 and with the position information indicating a position adjacent to the position that is indicated by the position information added to the currently distributed image.

It is assumed that the user terminal 20 is a tablet terminal, and that the "instruction to switch the image in the lateral direction" is a "swipe in the lateral direction." In this case, when a "swipe from right to left" is inputted to the user terminal 20 as the "instruction to switch the image in the lateral direction", the distribution unit 111 may distribute images to the user terminal 20 in the order of "an image corresponding to the shelf 1, an image corresponding to the shelf 2, an image corresponding to the shelf 3, . . . , an image corresponding to the shelf 15, and an image corresponding to the shelf 16" every time the "swipe from right to left" is inputted (see FIG. 1).

On the other hand, when a "swipe from left to right" is inputted to the user terminal 20 as the "instruction to switch the image in the lateral direction", the distribution unit 111 may distribute images to the user terminal 20 in the order of "the image corresponding to the shelf 16, the image corresponding to the shelf 15, the image corresponding to the shelf 14, . . . , the image corresponding to the shelf 2, and the image corresponding to the shelf 1" every time the "swipe from left to right" is inputted. That is, when the direction of the image switching instruction is inverted, the order of switching the image may also be inverted.

With this configuration, a user of the user terminal 20 can see the image distributed to the user terminal 20 at the same interval as that when actually going round in the store.

In the example embodiment, the "time indicated by the time information added to the image" is not limited to an actual time when the image is generated (e.g., is captured by the monitor camera C1 or the like), and is a concept including a time represented by a mode of representation of the time information. Therefore, the "image with the time information indicating the same time as that indicated by the time information added to the currently distributed image" is not limited to an image generated at exactly the same time as the actual time when the currently distributed image is generated.

Specifically, when the time information is represented by "hour and minute" (i.e., when seconds or less of the actual time are rounded down), for example, an image generated at "11:00:00" and an image generated at "11:00:20" are treated as an image generated at the same time in the remote monitoring system 1 since the time indicated by the time information is "11:00" in both cases. Alternatively, if the time information is represented by "5-minute increments", for example, an image generated at "11:00" and an image generated at "11:02" are treated as an image generated at the same time in the remote monitoring system 1 since the time indicated by the time information is "11:00" in both cases.

Similarly, in the example embodiment, the "position indicated by the position information added to the image" is not limited to an actual position (e.g., a position represented by latitude, longitude and altitude) in a range in the image (or a point that represents the range), and is a concept including a position represented by a mode of representation of the position information. Therefore, the "image with the position information indicating the same position as that indicated by the position information added to the currently distributed image" is not limited to an image obtained by capturing exactly the same range as that in the currently distributed image.

Specifically, when the position information is represented by a "reference numeral in a store view" (e.g., "shelf 1", "shelf 2", . . . , etc. in FIG. 1), if the position information added to each of the two images indicates the same reference numeral, the two images are treated as the image of the same position in the remote monitoring system 1.

The detection unit 114 compares two extraction images each of which is provided with the position information indicating the same position and with the time information indicating a different time, among the extraction images stored in the storage apparatus 14, and detects at least one of a foreign object, an abnormality, and a missing item in the store. The detection unit 114 further detects the abnormality on the basis of the sensor signals outputted from various sensors installed in the store to be monitored. Furthermore, the detection unit 114 detects a shelf allocation from an image(s) in which the product display shelf is captured among the extraction images stored in the storage apparatus 14. Since the existing techniques can be applied to each of foreign object detection, abnormality detection, missing item detection, and shelf allocation detection, since the existing techniques, a description of the details will be omitted.

The notification unit 115 gives a warning to at least one of the user terminals 20 and 30 when at least one of the foreign object, the abnormality, and the missing item is detected by the detection unit 114. When at least one of the foreign object and the abnormality is detected by the detection unit 114, the notification unit 115 may give a warning and may transmit an image indicating at least one situation of the foreign object and the abnormality detected, to at least one of the user terminal 20 and 30.

Here, when there are a plurality of images indicating at least one situation of the foreign object and the abnormality detected, the notification unit 115 compares the images with each other according to a predetermined comparative viewpoint. Then, the notification unit 115 may transmit one image selected on the basis of a comparison result, to at least one of the user terminals 20 and 30. The "comparative viewpoint" described above includes, for example, a "position and a size in an image of an image area in which the foreign object or the abnormality is captured", "image resolution", "presence or absence of an obstacle that conceals a part of the foreign object or the abnormality," and the like.

The communication unit 113, the storage apparatus 14, and the detection unit 14 respectively correspond to examples of the "distribution unit", the "storage unit", and the "detection unit" in Supplementary Note described later. The "instruction to switch the image in the lateral direction" and the "instruction to switch the image in the vertical direction" respectively correspond to examples of the "first switching instruction" and the "second switching instruction" in the Supplementary Note described later.

(Technical Effects)

In the remote monitoring system 1, when there is an instruction to switch the image in the vertical direction, for example, the extraction image that is provided with the time information indicating a different time from that indicated by the time information added to the image currently distributed to the user terminal 20 and with the position information indicating the same position as that indicated by the position information added to the currently distributed image, is distributed to the user terminal 20. Therefore, the user of the user terminal 20 can relatively easily perform fixed point observation on a certain position in the store, by giving the instruction to switch the image in the vertical direction.

Furthermore, in the remote monitoring system 1, when there is an instruction to switch the image in the lateral direction, for example, the extraction image that is provided with the time information indicating the same time as that indicated by the time information added to the image currently distributed to the user terminal 20 and with the position information indicating a different position from that indicated by the position information added to the currently distributed image, is distributed to the user terminal 20. Therefore, the user of the user terminal 20 can change the position in the store on which the fixed point observation is performed, by giving the instruction to switch the image in the lateral direction.

Thus, according to the remote monitoring system 1, an observer (e.g., the user of each of the user terminals 20 and 30) can appropriately grasp the state of the inside of the store to be monitored and its time change.

FIRST MODIFIED EXAMPLE

The image processing unit 112 compares (i) the extraction image that is stored in the storage apparatus 14 and that is provided with the position information indicating one position, with (ii) another frame image that is a frame image after the frame image that is the base of the extraction image and that includes the same subject as that included in the extraction image. Then, the image processing unit 112 may generate the extraction image from another frame image, on condition that an amount of change in the state of the subject is greater than a predetermined amount.

The "predetermined amount" is a value that determines whether or not to generate the extraction image from another frame image, and may be set in advance as a fixed value or as a variable value according to some parameter. For example, if the subject is a product display shelf, the "predetermined amount" may be set on the basis of a degree of reduction in displayed products.

Figure 8:
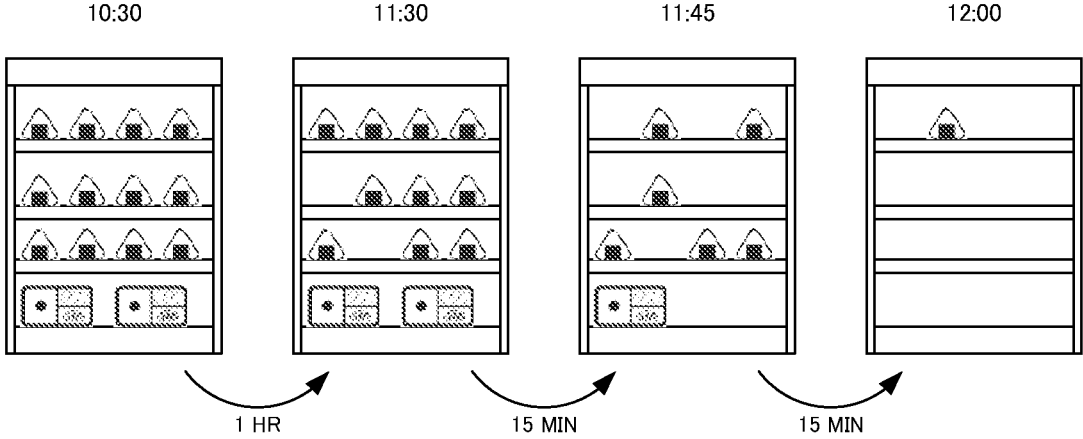
FIG. 8 is a diagram illustrating a concept of image acquisition of a remote monitoring apparatus according to a first modified example of the example embodiment.

With this configuration, for example, as illustrated in FIG. 8, when the amount of change in the state of the subject (which is a product display shelf in FIG. 8) is relatively small, the extraction image is generated and stored at a relatively long time interval. On the other hand, when the amount of change in the state of the subject is relatively large, the extraction image is generated and stored at a relatively short time interval. Therefore, when it is configured as described above, it is possible to appropriately present a change in the state of the subject, for example, to the user of each of the user terminals 20 and 30 while suppressing the extraction image stored in the storage apparatus 14.

Incidentally, the "image acquisition unit 111" and the "image processing unit 112" are respectively examples of the "acquisition unit" and the "extracting unit" in Supplementary Note described later.

SECOND MODIFIED EXAMPLE

Figure 9:
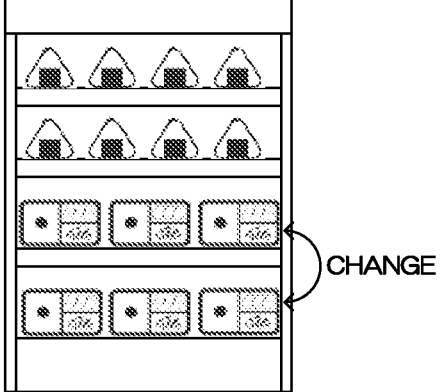
FIG. 9 is an example of an image processed by a user.

The user terminals 20 and 30 may have a function of performing processing (e.g., text input, drawing, etc.) on the image distributed from the remote monitoring apparatus 10. For example, it is assumed that the user of the user terminal 20 performs the processing as illustrated in FIG. 9 on the image distributed from the remote monitoring apparatus 10. The communication unit 113 of the remote monitoring apparatus 10 that has received from the user terminal 20 the processed image that specifies the user terminal 30 as a destination, may transfer the processed image to the user terminal 30.

With this configuration, it is possible to relatively easily share information among a plurality of users of user terminals. Incidentally, "the communication unit 113" corresponds to an example of the "transfer unit" in Supplementary Note described later.

THIRD MODIFIED EXAMPLE

Figure 10:
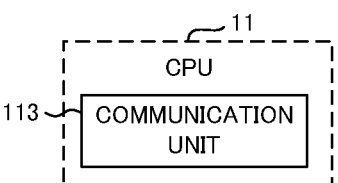
FIG. 10 is a block diagram illustrating a functional block implemented in a CPU of a remote monitoring apparatus according to a third modified example of the example embodiment.

As illustrated in FIG. 10, in the CPU 11 of the remote monitoring apparatus 10, the communication unit 113 is implemented, but a functional block other than the communication unit 113 may not be implemented.

FOURTH MODIFIED EXAMPLE

In this modified example, it is assumed that the remote monitoring apparatus 10 allows a plurality of stores to be monitored. In this case, the position information added to each of the extraction images stored in the storage apparatus 14 may include a store information on the store (e.g., an identification information on the store). In addition to the position information and the time information, an attribute information indicating an attribute of the subject may be added to each of the extraction images. Examples of attribute include, for example, beverages, fresh food, rice, bread, frozen foods, confectionery, magazines, books, visitors, and the like.

For example, when there is an instruction from the user terminal 20 to switch the image in the lateral direction, the communication unit 113 of the remote monitoring apparatus 10 may distribute to the user terminal 20 an extraction image that is provided with the time information indicating the same time as the that indicated by the time information added to the image currently distributed to the user terminal 20 and with the position information including the store information on a different store from that related to the store information included in the position information added to the currently distributed image. At this time, it is desirable that the communication unit 113 distributes to the user terminal 20 an extraction image that is provided with the attribute information indicating the same attribute as that indicated by the attribute information added to the image currently distributed to the user terminal 20, as the extraction image.

<Others>

The remote monitoring system 1 is not limited to for monitoring the store, but is also applicable to monitor, for example, a shopping street, a park, a parking lot, an outdoor part of a school, and the like that use one or more monitor cameras installed outside, and a common part of a building, such as an entrance, the inside of a factory, and the like that use one or more monitor cameras installed inside, for example.

In the description described above, the remote monitoring apparatus 10 (especially the communication unit 113) determines whether or not there is an image switching instruction from the user terminal 20, and when it is determined that there is an image switching instruction, it distributes to the user terminal 20 the extraction image selected in response to the image switching instruction. The user terminal 20, however, may determine whether or not there is an image switching instruction, and when it is determined that there is an image switching instruction, it may display the extraction image selected in response to the image switching instruction. In this case, the user terminal 20 may have a hardware configuration similar to that of the remote monitoring apparatus 10 (see FIG. 2) and may determine whether or not there is an image switching instruction in the CPU of the user terminal 20. When it is determined that there is an image switching instruction, a functional block for displaying the extraction image selected in accordance with the image switching instruction (e.g., a functional block corresponding to the communication unit 113 or the like described above) may be implemented. In this case, the user terminal 20 may determine whether or not there is an image switching instruction by determining whether or not the image switching instruction is inputted to the user terminal 20 via an input apparatus provided in the user terminal 20 (an apparatus corresponding to the input apparatus 15 in FIG. 2) (i.e., by determining whether or not the CPU provided in the user terminal 20 obtains the image switching instruction). In this case, the extraction image may be stored in a storage apparatus of the user terminal 20 (an apparatus corresponding to the storage apparatus 14 in FIG. 2).

Second Example Embodiment

The remote monitoring system 1 according to a second example embodiment will be described. The second example embodiment is the same as the first example embodiment described above, except that the operation of the remote monitoring apparatus 100 is partially different. Therefore, in the second example embodiment, the description that overlaps with that of the first example embodiment will be omitted, and the same parts on the drawings will be denoted by the same reference numerals. Basically, different points will be described.

The image processing unit 112 performs a person detection process and a person recognition process, as predetermined image processing, on a plurality of frame images obtained from the monitor cameras C1 to C8. The image processing unit 112 sets an identification information (hereinafter referred to as a "person identification information" as occasion demands) for a detected person (e.g., a clerk, a visitor, etc.). The image processing unit 112 extracts a predetermined image range including the detected person from the frame image in which the person is detected, and generates the extraction image. At this time, the image processing unit 112 adds the person identification information on the detected person, to the extraction image. For this reason, the person identification information on the same person is added to each of the extraction images in which the same person is captured.

When there is an instruction from the user terminal 20 to switch the image in the lateral direction, for example, the communication unit 113 distributes to the user terminal 20 an extraction image that is provided with the time information indicating the same time as that indicated by the time information added to the image currently distributed to the user terminal 20 and with a different person identification information from that added to the currently distributed image.

When there is an instruction from the user terminal 20 to switch the image in the vertical direction, for example, the communication unit 113 distributes to the user terminal 20 an extraction image that is provided with the time information indicating a different time from that indicated by the time information added to the image currently distributed to the user terminal 20 and with the same person identification information as that added to the currently distributed image.

<Supplementary Note>

With respect to the example embodiment described above, the following Supplementary Notes will be further disclosed.

(Supplementary Note 1)

A remote monitoring apparatus described in Supplementary Note 1 is a remote monitoring apparatus including:

a storage unit that stores a plurality of images to each of which a position information and a time information are added; and a distribution unit that distributes a first image of the plurality of images to a user terminal, wherein the distribution unit (i) distributes to the user terminal a second image to which a position information indicating a different position from that indicated by a first position information, which is the position information added to the first image, is added and to which a time information indicating a same time as that indicated by a first time information, which is the time information added to the first image, is added when receiving from the user terminal a first switching instruction indicating image switching of the first image in one direction, and (ii) distributes to the user terminal a third image to which a position information indicating a same position as that indicated by the first position information is added and to which a time information indicating a different time from that indicated by the first time information is added when receiving from the user terminal a second switching instruction indicating image switching of the first image in another direction that crosses the one direction.

(Supplementary Note 2)

A remote monitoring apparatus described in Supplementary Note 2 is the remote monitoring apparatus described in Supplementary Note 1, wherein the distribution unit distributes to the user terminal an image to which a position information indicating a position adjacent to the position that is indicated by the first position information and the time information indicating the same time as that indicated by the first time information, as the second image, when receiving the first switching instruction from the user terminal.

(Supplementary Note 3)

A remote monitoring apparatus described in Supplementary Note 3 is the remote monitoring apparatus described in Supplementary Note 1, wherein each of the plurality of images is an image obtained by imaging an inside of a store, the position information includes a store information on the store, and the distribution unit distributes to the user terminal an image that includes a different store information from that included in the first position information, out of the second image, when receiving the first switching instruction from the user terminal.

(Supplementary Note 4)

A remote monitoring apparatus described in Supplementary Note 4 is the remote monitoring apparatus described in Supplementary Note 3, wherein an attribute information indicating an attribute of a subject is added to each of the plurality of images, and the distribution unit distributes to the user terminal an image that includes a different store information from that included in the first position information and to which an attribute information indicating a same attribute as that indicated by the attribute information added to the first image, out of the second image, when receiving the first switching instruction from the user terminal.

(Supplementary Note 5)

A remote monitoring apparatus described in Supplementary Note 5 is the remote monitoring apparatus described in any one of Supplementary Notes 1 to 4, further including:

an acquisition unit that obtains a plurality of temporally continuous frame images from an imaging unit; and an extraction unit that compares, among the frame images, at least a part of one frame image, which is stored as one of the plurality of images in the storage unit, with another frame image that is a frame image after the one frame image and that includes a same subject as that included in at least a part of the one frame image to make the storage unit store at least a part of the another frame image as one of the plurality of images on condition that an amount of change in a state of the subject is greater than a predetermined amount.

(Supplementary Note 6)

A remote monitoring apparatus described in Supplementary Note 6 is the remote monitoring apparatus described in any one of Supplementary Notes 1 to 5, wherein each of the plurality of images is an image obtained by imaging an inside of a store, and the remote monitoring apparatus includes a detection unit that compares, among the plurality of images, two images to each of which the position information indicating a same position and the time information indicating different times are added and to detect at least one of a foreign object, an abnormality, and a missing item and/or to detect a shelf allocation from an image in which a product display shelf is included among the plurality of images.

(Supplementary Note 7)

A remote monitoring apparatus described in Supplementary Note 7 is the remote monitoring apparatus described in any one of Supplementary Notes 1 to 6, including a transfer unit that transfers a processed first image, which is the first image on which processing is performed, to another user terminal that is different from the user terminal, when receiving the processed first image from the user terminal.

(Supplementary Note 8)

A remote monitoring method described in Supplementary Note 8 is a remote monitoring method in a remote monitoring apparatus including: a storage unit that stores a plurality of images to each of which a position information and a time information are added; and a distribution unit that distributes a first image of the plurality of images to a user terminal, the remote monitoring method including:

a first distribution step that distributes to the user terminal a second image to which a position information indicating a different position from that indicated by a first position information, which is the position information added to the first image, is added and to which a time information indicating a same time as that indicated by a first time information, which is the time information added to the first image, is added, when a first switching instruction indicating image switching of the first image in one direction is received from the user terminal, and second distribution step that distributes to the user terminal a third image to which a position information indicating a same position as that indicated by the first position information is added and to which a time information indicating a different time from that indicated by the first time information is added, when a second switching instruction indicating image switching of the first image in another direction that crosses the one direction is received from the user terminal.

(Supplementary Note 9)

A computer program described in Supplementary Note 9 is a computer program that allows a computer to execute the remote monitoring method described in Supplementary Note 8.

(Supplementary Note 10)

A recording medium described in Supplementary Note 10 is a recording medium on which the computer program described in Supplementary Note 9 is recorded.

(Supplementary Note 11)

A remote monitoring system described in Supplementary Note 11 is a remote monitoring system including:

a remote monitoring apparatus; and a user terminal, the remote monitoring apparatus including:

a storage unit that stores a plurality of images to each of which a position information and a time information are added; and a distribution unit that distributes a first image of the plurality of images to a user terminal, wherein the distribution unit (i) distributes to the user terminal a second image to which a position information indicating a different position from that indicated by a first position information, which is the position information added to the first image, is added and to which a time information indicating a same time as that indicated by a first time information, which is the time information added to the first image, is added when receiving from the user terminal a first switching instruction indicating image switching of the first image in one direction, and (ii) distributes to the user terminal a third image to which a position information indicating a same position as that indicated by the first position information is added and to which a time information indicating a different time from that indicated by the first time information is added, when receiving from the user terminal a second switching instruction indicating image switching of the first image in another direction that crosses the one direction.

(Supplementary Note 12)

A remote monitoring apparatus described in Supplementary Note 12 is a remote monitoring apparatus including:

a storage unit that stores a plurality of images to each of which an identification information on a person as a subject and a time information are added; and a distribution unit that distributes a first image of the plurality of images to a user terminal, wherein the distribution unit (i) distributes to the user terminal a second image to which a different identification information from a first identification information, which is the identification information added to the first image, is added and to which a time information indicating a same time as that indicated by a first time information, which is the time information added to the first image, is added when receiving from the user terminal a first switching instruction indicating image switching of the first image in one direction, and (ii) distributes to the user terminal a third image to which a same identification information as the first identification information is added and to which a time information indicating a different time from that indicated by the first time information is added, when receiving from the user terminal a second switching instruction indicating image switching of the first image in another direction that crosses the one direction.

(Supplementary Note 13)

An image display apparatus described in Supplementary Note 13 (e.g., the user terminal described in the above Supplementary Notes) is an image display apparatus including:

a display unit that displays a first image of a plurality of images to each of which a position information and a time information are added; and an acquisition unit that obtains a switching instruction for switching the image to be displayed by the display unit, wherein the display unit (i) displays a second image to which a position information indicating a different position from that indicated by a first position information, which is the position information added to the first image, is added and to which a time information indicating a same time as that indicated by a first time information, which is a time information added to the first image, is added when a first switching instruction indicating image switching of the first image in one direction is obtained as the switching instruction, and (ii) displays a third image to which a position information indicating a same position as that indicated by the first position information is added and to which a time information indicating a different time from that indicated by the first time information is added, when a second switching instruction indicating image switching of the first image in another direction that crosses the one direction is obtained as the switching instruction.

(Supplementary Note 14)

An image display apparatus according to Supplementary Note 14 is an image display apparatus including:

a display unit that displays a first image of a plurality of images to each of which an identification information on a person as a subject and a time information are added; and an acquisition unit that obtains a switching instruction for switching images to be displayed by the display unit, wherein the display unit (i) displays a second image to which a different identification information from a first identification information, which is the identification information added to the first image, is added and to which a time information indicating a same time as that indicated by a first time information, which is the time information added to the first image, is added when a first switching instruction indicating image switching of the first image in one direction is obtained as the switching instruction, and (ii) displays a third image to which a same identification information as the first identification information is added and to which a time information indicating a different time from that indicated by the first time information is added, when a second switching instruction indicating image switching of the first image in another direction that crosses the one direction is obtained as the switching instruction.

The present invention is not limited to the examples described above and is allowed to be changed, if desired, without departing from the essence or spirit of the invention which can be read from the claims and the entire specification. A monitoring apparatus, a monitoring method, a computer program and recording medium, which involve such changes, are also intended to be within the technical scope of the present invention.

This application is based upon and claims the benefit of priority from Japanese Patent Application No. 2019-107762, filed Jun. 10, 2019, and incorporates all of its disclosure herein.

DESCRIPTION OF REFERENCE CODES

1 . . . Remote monitoring system, 10 . . . Remote monitoring apparatus, 20, 30 . . . User terminal, 111 . . . Image acquisition unit, 112 . . . Image processing unit, 113 . . . Communication unit, 114 . . . Detection unit, 115 . . . Notification unit

What is claimed is:

1. A remote monitoring apparatus, which communicates with a user terminal through a network, comprising:

a storage that stores a plurality of images each of which has a position information and a time information; and a controller that is programmed to distribute a first image of the plurality of images to the user terminal through the network, wherein the first image has a first position information as the position information and a first time information as the time information, the controller is programmed to receive a first switching instruction indicating image switching of the first image in a first direction of the first image from the user terminal, in response to the first switching instruction, distribute a second image which has a second position information as the position information and a second time information as the time information, to the user terminal through the network, wherein the second position information indicates a different position from a position indicated by the first position information, the second time information indicates a same time as a time indicated by the first time information, receive a second switching instruction indicating image switching of the first image in a second direction of the first image that is different from the first direction from the user terminal, and in response to the second switching instruction, distribute a third image which has a third position information as the position information and a third time information as the time information, to the user terminal through the network, wherein the third position information indicates a same position as the position indicated by the first position information, the third time information indicates a different time from the time indicated by the first time information, wherein the controller that is programmed to distribute an image which has a position information indicating a position adjacent to the position indicated by the first position information and a time information indicating the same time as the time indicated by the first time information, as the second image, to the user terminal through the network, in response to the first switching instruction from the user terminal.

2. The remote monitoring apparatus according to claim 1, wherein each of the plurality of images is an image obtained by imaging an inside of a store, the position information includes a store information on the store, and the controller is programmed to distribute an image which has a position information including a different store information from a store information included in the first position information, as the second image, to the user terminal through the network, in response to the first switching instruction from the user terminal.

3. The remote monitoring apparatus according to claim 2, wherein each of the plurality of images has an attribute information indicating an attribute of a subject, and the controller that is programmed to distribute to an image which has a position information including a different store information from the store information included in the first position information and has an attribute information indicating a same attribute as an attribute indicated by an attribute information of the first image, as the second image, to the user terminal through the network, in response to the first switching instruction from the user terminal.

4. The remote monitoring apparatus according to claim 1, wherein the controller is programmed to obtain a plurality of temporally continuous frame images from an imaging unit, the controller is programmed to:

compare, among the plurality of temporally continuous frame images, at least a part of a first frame image with a second frame image, wherein the at least the part of the first image is stored as one of the plurality of images in the storage, wherein the second frame image is a frame image after the first frame image and includes a same subject as a subject included in the at least the part of the first frame image, and make the storage store at least a part of the second frame image as one of the plurality of images on condition that an amount of change in a state of the subject is greater than a predetermined amount.

5. The remote monitoring apparatus according to claim 1, wherein the controller is programmed to:

detect at least one of a foreign object, an abnormality, and a missing item on the basis of two images among the plurality of images, wherein each of the two images has position information and time information, wherein the position information of the two images indicate a same position, wherein the time information of the two images indicate different times, and/or detect a shelf allocation from an image in which a product display shelf is included among the plurality of images.

6. The remote monitoring apparatus according to claim 1, wherein the remote monitoring apparatus communicates with a plurality of user terminals through the network, the controller is programmed to:

receive a processed first image, which is the first image on which processing is performed, from one user terminal of the plurality of user terminals, and transfer the processed first image to another user terminal of the plurality of user terminals through the network.

7. A remote monitoring method in a remote monitoring apparatus, which communicates with a user terminal through a network, including: a storage that stores a plurality of images each of which has a position information and a time information; and a controller that is programmed to distribute a first image of the plurality of images to the user terminal through the network, wherein the first image has a first position information as the position information and a first time information as the time information, the remote monitoring method comprising:

receiving a first switching instruction indicating image switching of the first image in a first direction of the first image from the user terminal, in response to the first switching instruction, distributing a second image which has a second position information as the position information and a second time information as the time information, to the user terminal through the network, wherein the second position information indicates a different position from a position indicated by the first position information, the second time information indicates a same time as a time indicated by the first time information, receiving a second switching instruction indicating image switching of the first image in a second direction of the first image that is different from the first direction from the user terminal, in response to the second switching instruction, distributing a third image which has a third position information as the position information and a third time information as the time information, to the user terminal through the network, wherein the third position information indicates a same position as the position indicated by the first position information, the third time information indicates a different time from the time indicated by the first time information, and distributing an image which has a position information indicating a position adjacent to the position indicated by the first position information and a time information indicating the same time as the time indicated by the first time information, as the second image, to the user terminal through the network, in response to the first switching instruction from the user terminal.

8. A non-transitory recording medium on which a computer program that allows a computer to execute a remote monitoring method is recorded, the remote monitoring method being a remote monitoring method in a remote monitoring apparatus, which communicates with a user terminal through a network, including: a storage that stores a plurality of images each of which has a position information and a time information; and a controller that is programmed to distribute a first image of the plurality of images to the user terminal through the network, wherein the first image has a first position information as the position information and a first time information as the time information, the remote monitoring method comprising:

receiving a first switching instruction indicating image switching of the first image in a first direction of the first image from the user terminal, in response to the first switching instruction, distributing a second image which has a second position information as the position information and a second time information as the time information, to the user terminal through the network, wherein the second position information indicates a different position from a position indicated by the first position information, the second time information indicates a same time as a time indicated by the first time information, receiving a second switching instruction indicating image switching of the first image in a second direction of the first image that is different from the first direction from the user terminal, in response to the second switching instruction, distributing a third image which has a third position information as the position information and a third time information as the time information, to the user terminal through the network, wherein the third position information indicates a same position as the position indicated by the first position information, the third time information indicates a different time from the time indicated by the first time information, and distributing an image which has a position information indicating a position adjacent to the position indicated by the first position information and a time information indicating the same time as the time indicated by the first time information, as the second image, to the user terminal through the network, in response to the first switching instruction from the user terminal.

9. A remote monitoring system comprising:

a remote monitoring apparatus; and a user terminal, the remote monitoring apparatus communicating with the user terminal through a network, the remote monitoring apparatus comprising:

a storage that stores a plurality of images each of which has a position information and a time information; and a controller that is programmed to distribute a first image of the plurality of images to the user terminal through the network, wherein the first image has a first position information as the position information and a first time information as the time information, the controller that is programmed to receive a first switching instruction indicating image switching of the first image in a first direction of the first image from the user terminal, in response to the first switching instruction, distribute a second image which has a second position information as the position information and a second time information as the time information, to the user terminal through the network, wherein the second position information indicates a different position from a position indicated by the first position information, the second time information indicates a same time as a time indicated by the first time information, receive a second switching instruction indicating image switching of the first image in a second direction of the first image that is different from the first direction from the user terminal, and in response to the second switching instruction, distribute a third image which has a third position information as the position information and a third time information as the time information, to the user terminal through the network, wherein the third position information indicates a same position as the position indicated by the first position information, the third time information indicates a different time from the time indicated by the first time information, wherein the controller that is programmed to distribute an image which has a position information indicating a position adjacent to the position indicated by the first position information and a time information indicating the same time as the time indicated by the first time information, as the second image, to the user terminal through the network, in response to the first switching instruction from the user terminal.

10. An image displaying apparatus, which communicates with a remote monitoring apparatus through a network, comprising:

a controller that is programmed to receive a first image from the remote monitoring apparatus through the network; and a display that displays the first image, wherein the first image has a first position information as the position information and a first time information as the time information, the controller is programmed to:

detect a first switching instruction indicating image switching of the first image in a first direction of the first image, in response to the first switching instruction, send the first switching instruction to the remote monitoring apparatus through the network, and receive a second image which has a second position information and a second time information from the remote monitoring apparatus through the network, wherein the second position information indicates a different position from a position indicated by the first position information, the second time information indicates a same time as a time indicated by the first time information, the display is configured to display the second image, the controller is programmed to:

detect a second switching instruction indicating image switching of the first image in a second direction of the first image that is different from the first direction, in response to the second switching instruction, send the second switching instruction to the remote monitoring apparatus through the network, and receive a third image which has a third position information and a third time information from the remote monitoring apparatus through the network, wherein the third position information indicates a same position from the position indicated by the first position information, the third time information indicates a different time from the time indicated by the first time information, the display is configured to display the third image, wherein the controller that is programmed to distribute an image which has a position information indicating a position adjacent to the position indicated by the first position information and a time information indicating the same time as the time indicated by the first time information, as the second image, to the user terminal through the network, in response to the first switching instruction from the user terminal.

* * * * *